(12) United States Patent
Ice

(10) Patent No.: US 7,543,995 B2
(45) Date of Patent: Jun. 9, 2009

(54) OPTICAL SUBASSEMBLY CONNECTOR BLOCK FOR AN OPTOELECTRONIC MODULE

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/693,674

(22) Filed: Mar. 29, 2007

(65) Prior Publication Data

US 2008/0145002 A1 Jun. 19, 2008

Related U.S. Application Data

(60) Provisional application No. 60/870,806, filed on Dec. 19, 2006, provisional application No. 60/870,807, filed on Dec. 19, 2006.

(51) Int. Cl.
G02B 6/36 (2006.01)
(52) U.S. Cl. .......................................... 385/92; 385/89
(58) Field of Classification Search ....................... None
See application file for complete search history.

(56) References Cited

U.S. PATENT DOCUMENTS

| | | | | |
|---|---|---|---|---|
| 4,911,519 | A * | 3/1990 | Burton et al. ................. | 385/14 |
| 6,302,596 | B1 * | 10/2001 | Cohen et al. .................. | 385/93 |
| 6,494,736 | B2 | 12/2002 | Mito | |
| 6,652,158 | B2 | 11/2003 | Bartur et al. | |
| 6,712,527 | B1 * | 3/2004 | Chan et al. .................... | 385/88 |
| 2002/0136501 | A1 * | 9/2002 | Yen et al. ...................... | 385/88 |
| 2003/0020998 | A1 * | 1/2003 | Kuczynski ................... | 359/245 |
| 2003/0072540 | A1 * | 4/2003 | Huang ........................ | 385/92 |
| 2003/0185525 | A1 * | 10/2003 | Lacy et al. ..................... | 385/92 |
| 2004/0264887 | A1 * | 12/2004 | Rosenberg et al. ............ | 385/92 |
| 2006/0093281 | A1 * | 5/2006 | Kesler .......................... | 385/88 |
| 2006/0281357 | A1 | 12/2006 | Chen et al. | |

FOREIGN PATENT DOCUMENTS

| | | |
|---|---|---|
| JP | 16012672 | 1/2004 |
| JP | 17275407 | 10/2005 |
| JP | 18106751 | 4/2006 |
| JP | 18106752 | 4/2006 |
| JP | 18108684 | 4/2006 |
| JP | 18259731 | 9/2006 |

OTHER PUBLICATIONS

Ice, Donald A., Electromagnetic Interference Shield for an Optoelectronic Module, U.S. Appl. No. 11/693,679, filed Mar. 29, 2007.

(Continued)

*Primary Examiner*—Sung H Pak
*Assistant Examiner*—Mike Stahl
(74) *Attorney, Agent, or Firm*—Workman Nydegger

(57) ABSTRACT

An optical subassembly ("OSA") connector block that can accommodate OSAs of a variety of different configurations. In one example embodiment, an OSA connector block includes a body. The body of the OSA connector block includes a first end defining a receptacle, and a second end defining a cavity. The receptacle is configured to receive at least a portion of an optical fiber connector. The cavity is configured to receive at least a portion of an OSA.

19 Claims, 12 Drawing Sheets

OTHER PUBLICATIONS

Ice, Donald A., Optical Connector Latch Assembly for an Optoelectronic Module, U.S. Appl. No. 11/693,681, filed Mar. 29, 2007.

Ice, Donald A., Latch Assembly for an Optoelectronic Module, U.S. Appl. No. 11/693,687, filed Mar. 29, 2007.

Ice, Donald A., Connectorized Optical Subassembly Block for Use with a Communications Module, U.S. Appl. No. 60/870,806, filed Dec. 19, 2006.

Ice, Donald A., EMI Shield for Placement between an Optical Subassembly and a Connector Block in a Communications Module, U.S. Appl. No. 60/870,807, filed Dec. 19, 2006.

U.S. Appl. No. 11/960,530, filed Dec. 19, 2008, Donald A. Ice.

U.S. Appl. No. 11/960,550, filed Dec. 19, 2008, Donald A. Ice.

U.S. Appl. No. 11/693,687, Jan. 24, 2008, Office Action.

U.S. Appl. No. 11/693,681, Mar. 4, 2008, Office Action.

U.S. Appl. No. 11/960,530, Apr. 3, 2008, Office Action.

\* cited by examiner

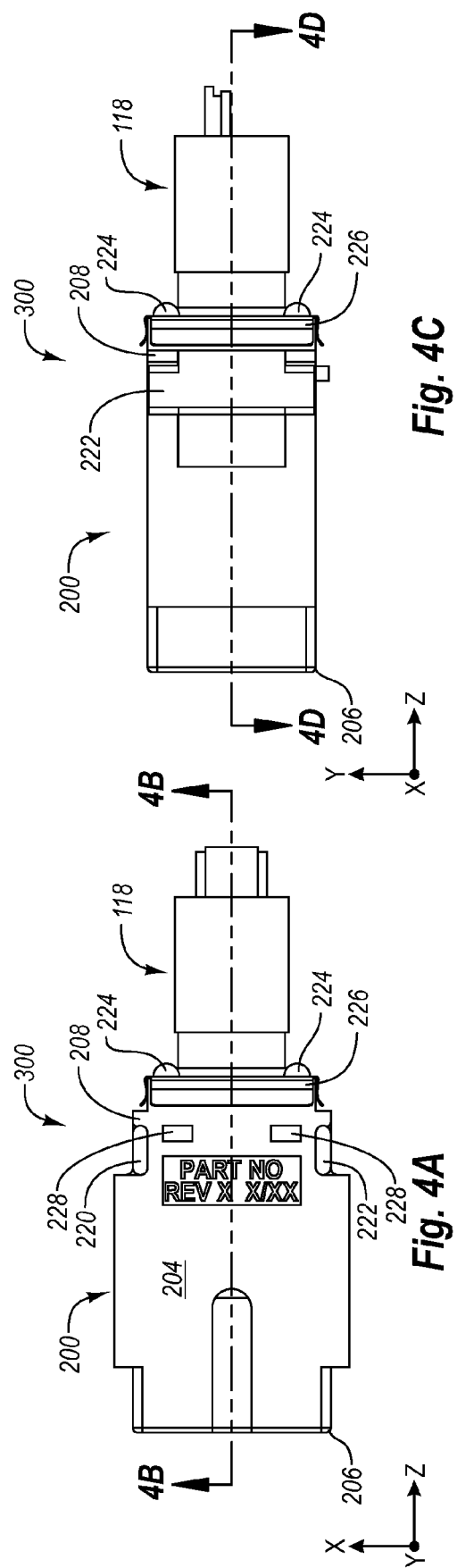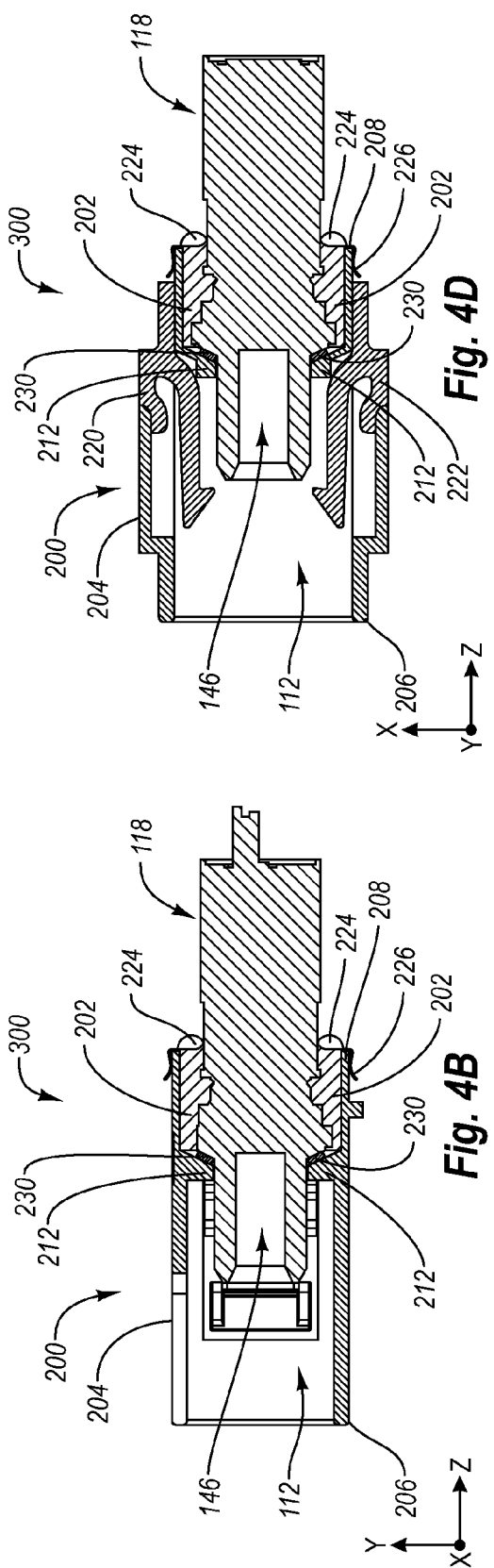

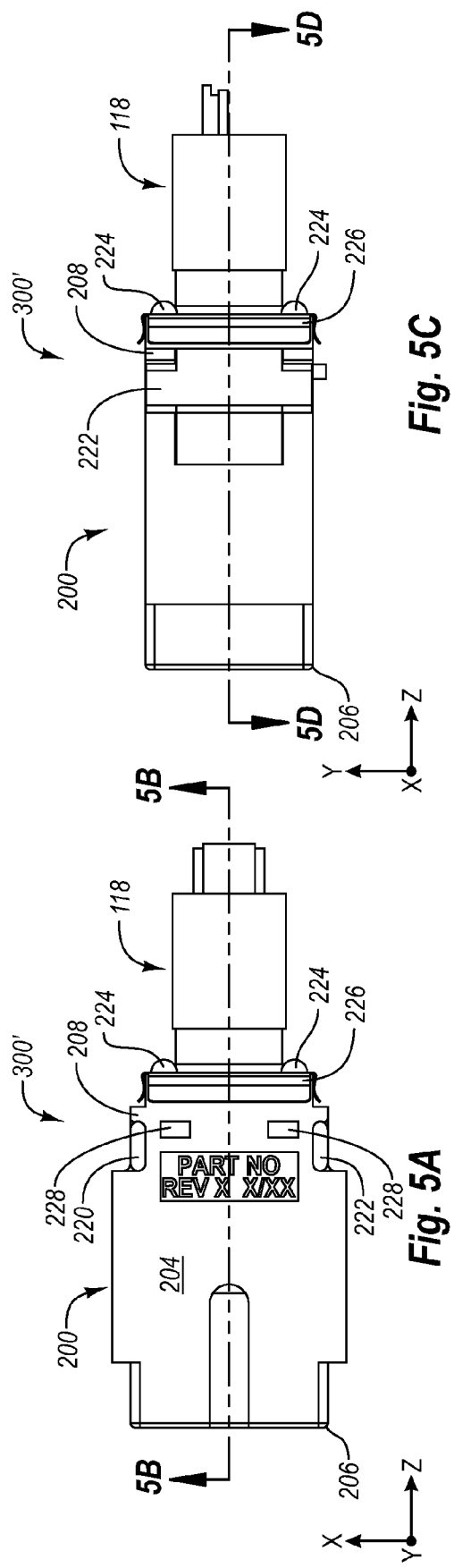
Fig. 5A
Fig. 5C
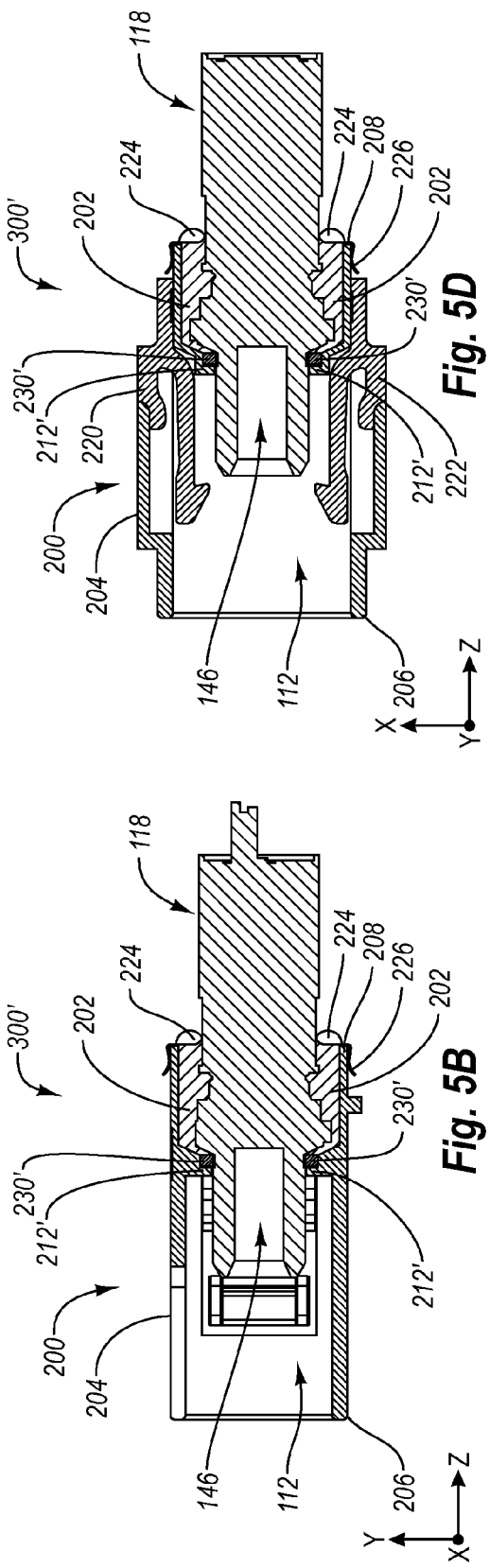
Fig. 5B
Fig. 5D

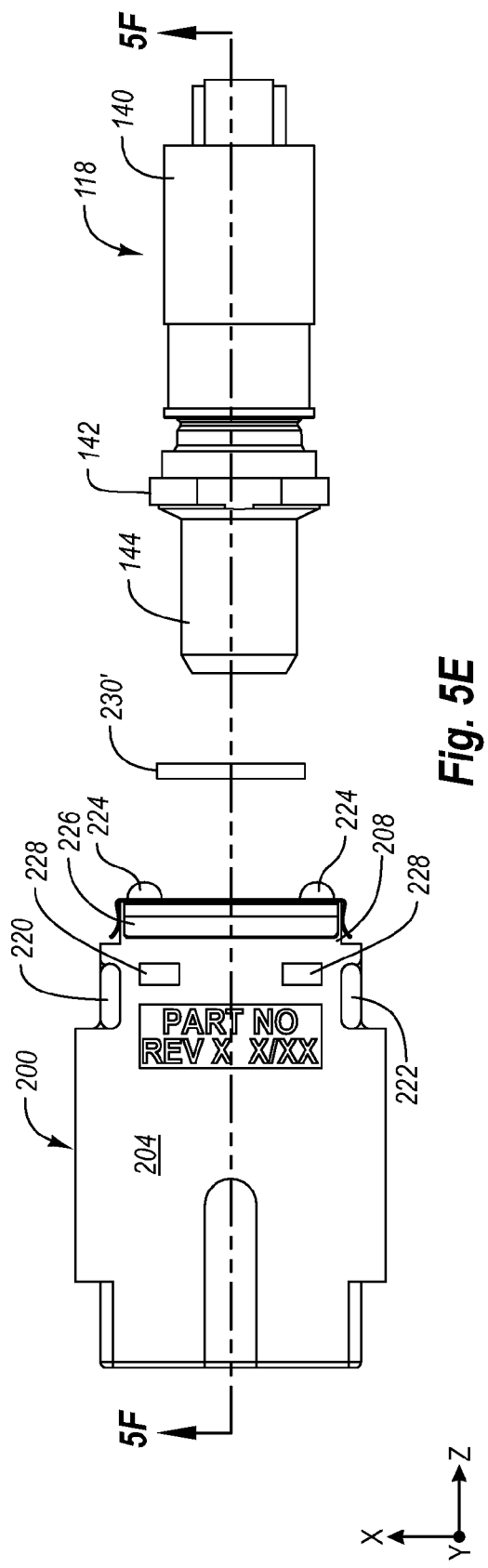
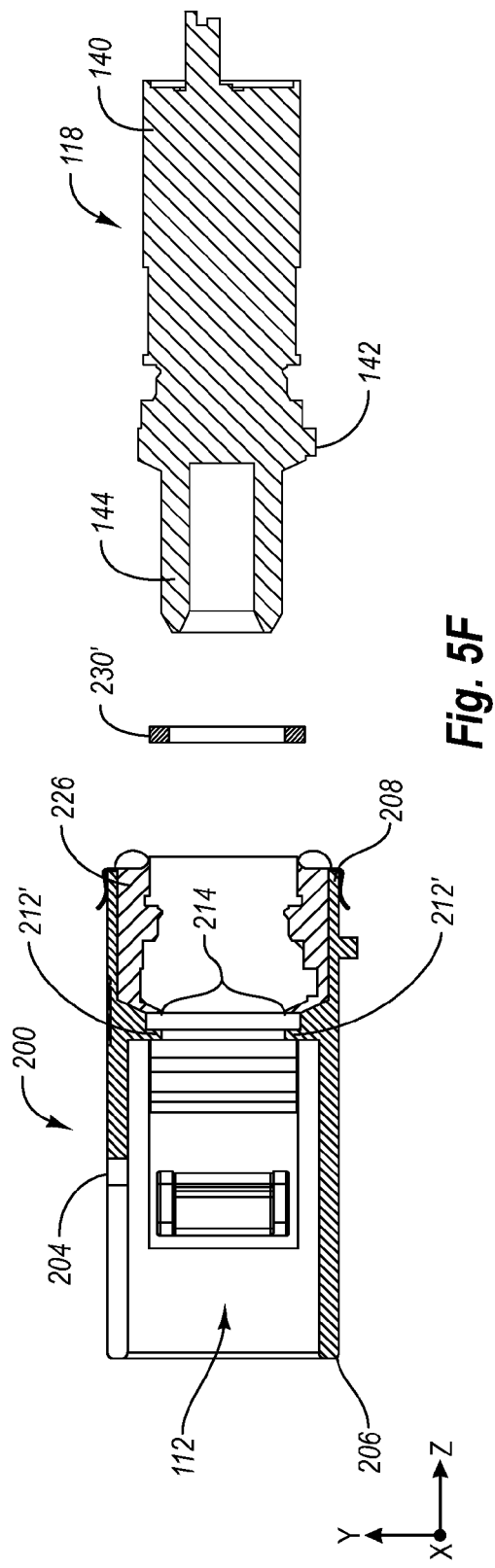
Fig. 5E
Fig. 5F

OPTICAL SUBASSEMBLY CONNECTOR BLOCK FOR AN OPTOELECTRONIC MODULE

CROSS-REFERENCE TO RELATED APPLICATIONS

This application claims priority to U.S. Provisional Patent Application Ser. No. 60/870,806, filed on Dec. 19, 2006 and U.S. Provisional Patent Application Ser. No. 60/870,807, filed on Dec. 19, 2006, each of which is incorporated herein by reference in its entirety.

BACKGROUND

Optoelectronic modules, such as optoelectronic transceiver or transponder modules, are increasingly used in optoelectronic communication. An optoelectronic module, such as an optoelectronic transponder module, includes various components that are necessary to enable optical data transmission and reception. The components are housed within a housing of the optoelectronic module. Examples of such internal components include a printed circuit board ("PCB"), a transmitter optical subassembly ("TOSA") and a receiver optical subassembly ("ROSA"). The optoelectronic module itself is configured to be received within a host device that serves as one component of a communications network.

In order to enable optical communication with other optoelectronic modules and devices in a communications network, an optoelectronic module is configured to connect with one or more optical fibers. To enable such connection, the optoelectronic module includes both a transmit receptacle and receive receptacle that are each configured to receive an optical fiber connector. Typically, these receptacles are defined in the housing of the optoelectronic module. Though functional, this design brings with it some challenges including alignment issues between nose pieces of the TOSA/ROSA and the respective optical fiber connectors, hard plug issues, and wiggle performance concerns.

SUMMARY OF SOME EXAMPLE EMBODIMENTS

In general, example embodiments of the invention relate to optoelectronic modules and, in particular, to an optical subassembly ("OSA") connector block for an optoelectronic module. The example OSA connector block can accommodate OSAs of a variety of different configurations while improving operational aspects of module interconnection with an optical fiber, including optical fiber pluggability and wiggle performance.

In one example embodiment, an OSA connector block includes a monolithic body. The body of the OSA connector block includes a first end defining a receptacle, and a second end defining a cavity. The receptacle is configured to receive at least a portion of an optical fiber connector. The cavity is configured to receive at least a portion of an OSA.

In another example embodiment, an OSA connector assembly includes an OSA, an OSA connector block, and an adhesive with which the OSA is attached to the OSA connector block. In this example embodiment, the OSA connector block includes a monolithic body. The body of the OSA connector block includes a first end defining a receptacle, and a second end defining a cavity in which at least a portion of the OSA is situated. The receptacle is configured to receive at least a portion of an optical fiber connector.

In yet another example embodiment, an optoelectronic module includes a transmitter OSA, a receiver OSA, a printed circuit board in electrical communication with the transmitter OSA and the receiver OSA, and a pair of OSA connector blocks. Each of the OSA connector blocks corresponds to one of the OSAs. In this example embodiment, the OSA connector blocks each include a monolithic body. The body of each OSA connector block includes a first end defining a receptacle, and a second end defining a cavity in which at least a portion of the corresponding OSA is situated. The receptacle is configured to receive at least a portion of an optical fiber connector.

In another example embodiment, an optoelectronic module includes a first OSA; a second OSA; a printed circuit board in electrical communication with the first and second OSAs; a first OSA connector block corresponding to the first OSA; a second OSA connector block corresponding to the second OSA; and a housing within which the OSAs, the printed circuit board, and the OSA connector blocks are at least partially situated. In this example embodiment, each OSA connector block includes a monolithic body. The body of each OSA connector block includes a first end defining a receptacle, and a second end defining a cavity in which at least a portion of the corresponding OSA is situated. The receptacle is configured to receive at least a portion of an optical fiber connector. Also, in this example embodiment, the bodies of the first and second OSA connector blocks have substantially similar external dimensions and form factors, but dissimilar internal dimensions and form factors.

These and other aspects of example embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which:

FIGS. 4A-4F are directed to various views of the OSA connector assembly of FIGS. 3A and 3B; and FIGS. 5A-5F are directed to various views of an alternative embodiment of the OSA connector assembly of FIGS. 3A and 3B.

DETAILED DESCRIPTION OF EXAMPLE EMBODIMENTS

Figure 1A:
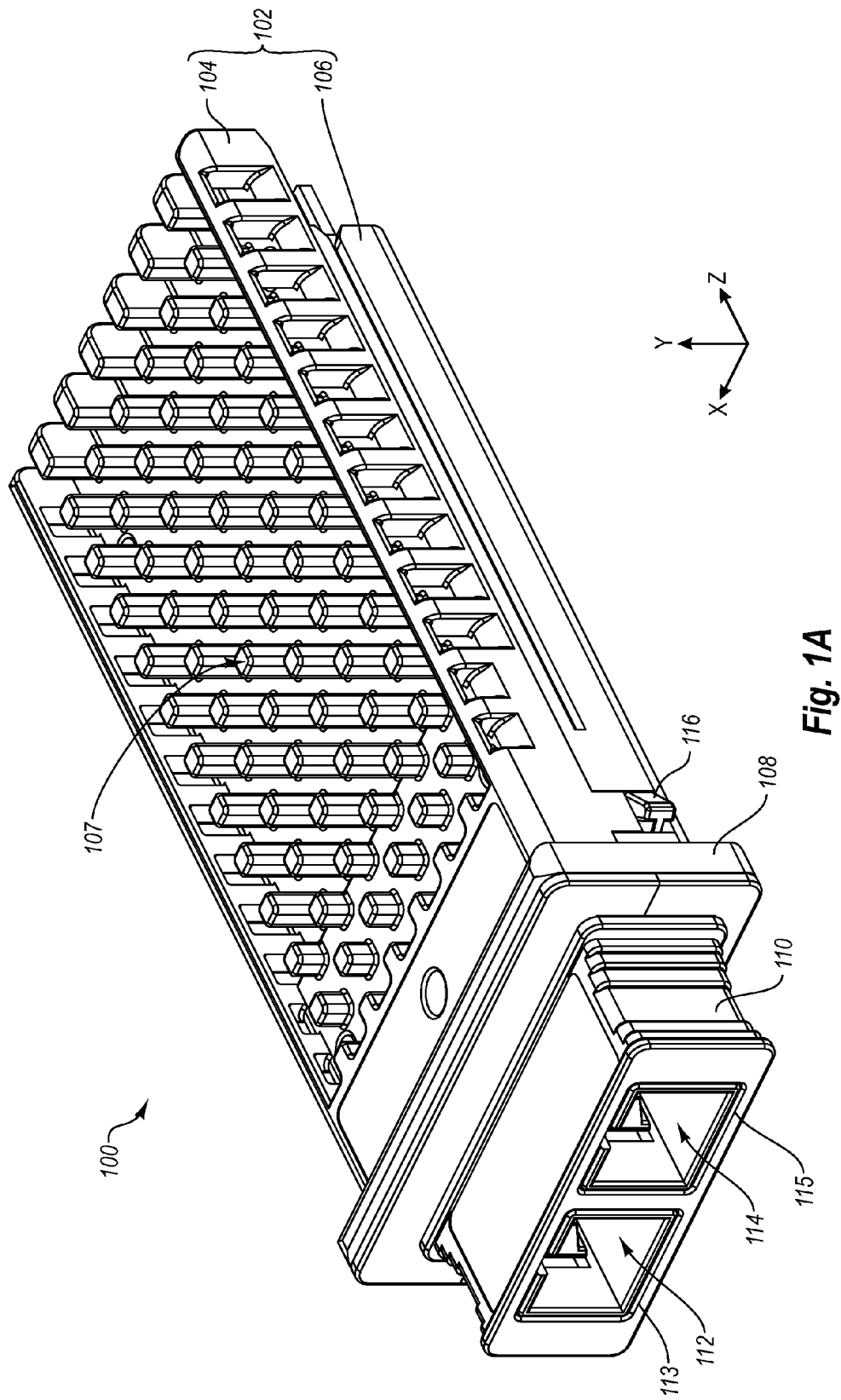
FIG. 1A discloses an example optoelectronic module.

As noted above, example embodiments of the invention relate to an optical subassembly ("OSA") connector block for an optoelectronic module. The example OSA connector block can accommodate OSAs of a variety of different configurations while improving operational aspects of module interconnection with an optical fiber, including optical fiber pluggability and wiggle performance.

1. Example Optoelectronic Module

Reference is first made to FIGS. 1A-1D, which disclose various aspects of an example optoelectronic module 100 for use in transmitting and receiving optical signals in connection with a host device (not shown). As disclosed in FIG. 1A, the optoelectronic module 100 includes various components, including a housing 102 that includes a cover 104 and a shell 106. The cover 104 includes a heat sink 107. The heat sink 107 functions to dissipate heat generated within the optoelectronic module 100. The cover 104 and the shell 106 can be formed using a die casting process. One example material from which the cover 104 and the shell 106 can be die cast is a zinc alloy, although the cover 104 and the shell 106 may alternatively be die cast, or otherwise constructed, from other suitable materials.

Figure 1B:
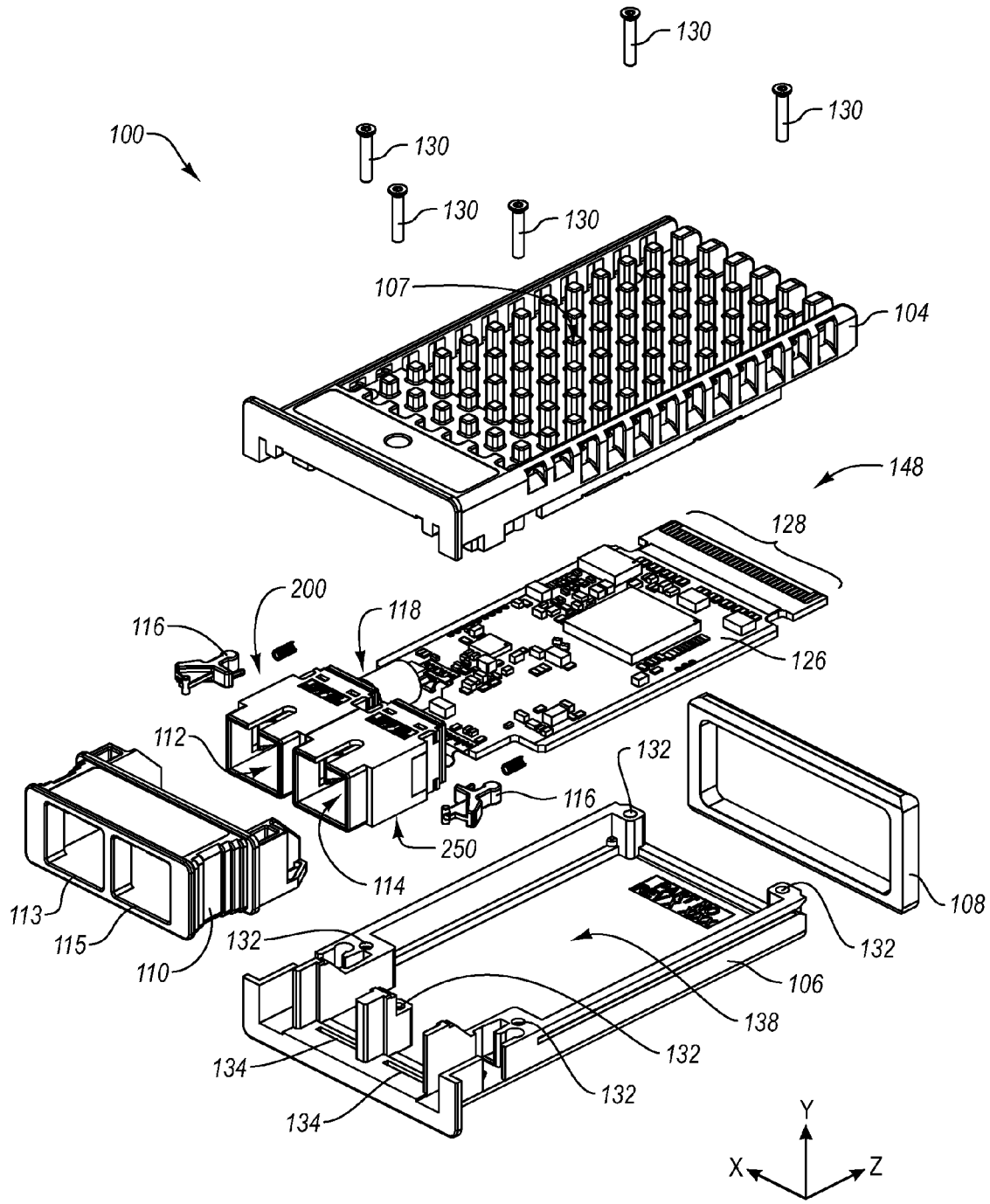
FIG. 1B is an exploded perspective view of the optoelectronic module of FIG. 1A including an example OSA connector block and an example TOSA.

As disclosed in FIGS. 1A and 1B, the example optoelectronic module 100 also includes an EMI gasket 108 that encircles the cover 104 and the shell 106, a de-latch sleeve 110 connected to the cover 104 and the shell 106, a transmit receptacle 112 and a receive receptacle 114 that can be accessed, respectively, through openings 113 and 115 defined in the de-latch sleeve 110, and a pair of latches 116 that are mechanically connected to the de-latch sleeve 110. Each of the receptacles 112 and 114 are configured to receive an optical fiber connector (not shown). The receptacles 112 and 114 can each be configured to receive an optical fiber connector having one of various configurations including, but not limited to, an SC optical fiber connector. The de-latch sleeve 110 can be employed to disengage the latches 116 from a host device (not shown). Additional details regarding the structure and function of example embodiments of a de-latch sleeve and a corresponding pair of latches can be found in co-pending U.S. patent application Ser. No. 11/693,687, titled "LATCH ASSEMBLY FOR AN OPTOELECTRONIC MODULE," which is filed concurrently herewith and incorporated herein by reference in its entirety.

Figure 1C:
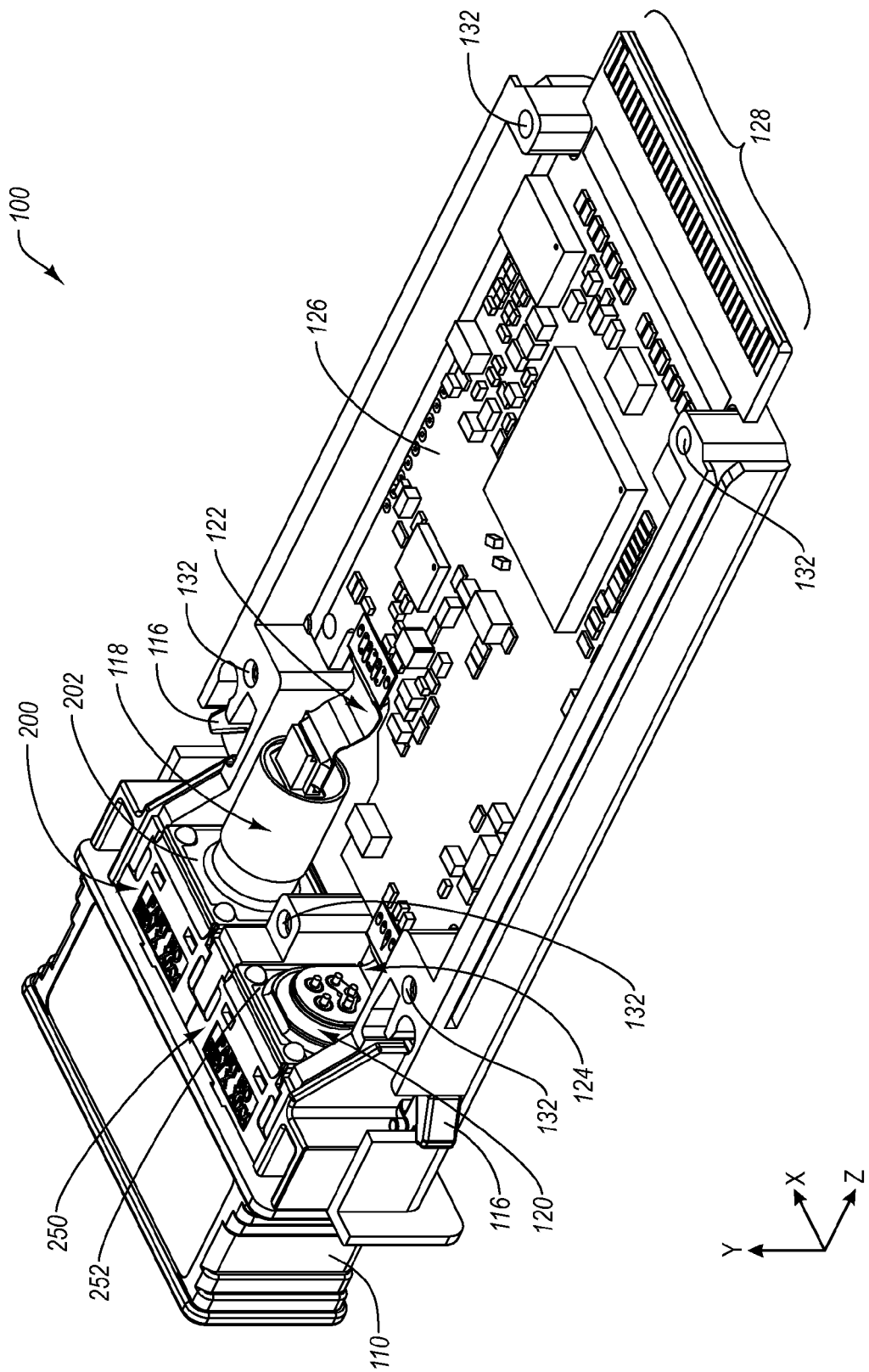
FIG. 1C is a partial rear perspective view of the optoelectronic module of FIG. 1A, with the cover removed, the optoelectronic module including the example OSA connector block and the example TOSA of FIG. 1B.

As disclosed in FIGS. 1B and 1C, the example optoelectronic module 100 further includes a transmitter OSA ("TOSA") 118, a receiver OSA ("ROSA") 120, and two substantially identical OSA connector blocks 200 and 250 within which the TOSA 118 and the ROSA 120, respectively, are partially positioned. The TOSA 118 and the ROSA 120 are held in place within the OSA connector blocks 200 and 250 by adhesives 202 and 252, respectively. It is noted that as the TOSA 118 and the ROSA 120 may have different form factors, the adhesives 202 and 252 may have different sizes, shapes, and/or volumes that correspond to the different form factors, respectively, to securely and permanently connect the TOSA 118 and the ROSA 120 to the OSA connector blocks 200 and 250. The example optoelectronic module 100 also includes electrical interfaces 122 and 124 and a printed circuit board ("PCB") 126 having an edge connector 128. The two electrical interfaces 122 and 124 are used to electrically connect the TOSA 118 and the ROSA 120, respectively, to the PCB 126. The edge connector 128 can be used to electrically connect the PCB 126 with a host device (not shown).

Figure 1D:
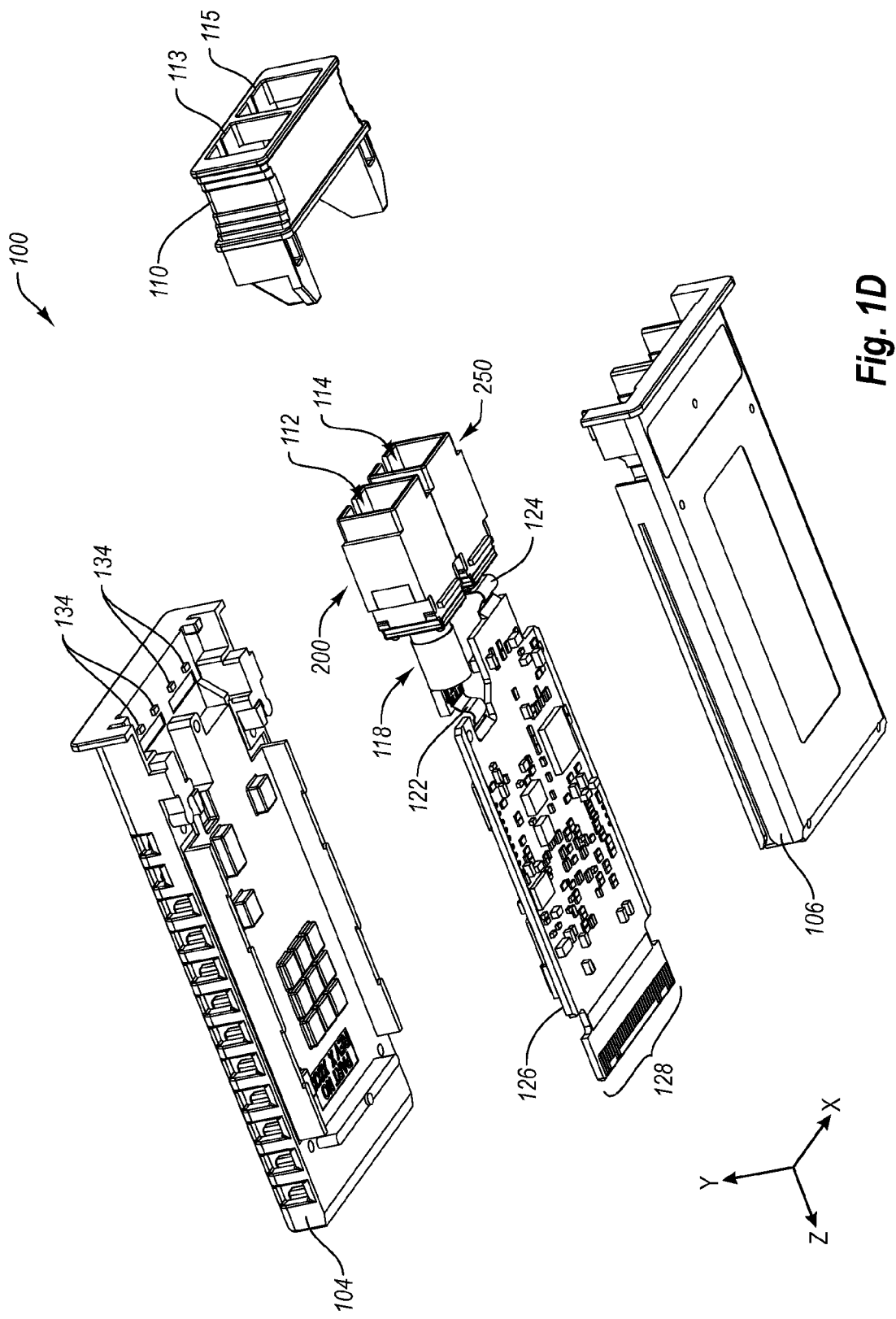
FIG. 1D is a bottom exploded perspective view of portions of the optoelectronic module of FIG. 1A including the example OSA connector block and the example TOSA of FIG. 1B.

With continuing reference to FIGS. 1B-1D, the cover 104 and the shell 106 of the housing 102 can be connected to each other using fasteners 130. The fasteners 130 are configured to pass through the cover 104 and engage holes 132 in the shell 106. As disclosed in FIGS. 1B and 1D, the cover 104 and the shell 106 of the housing 102 also includes various structures 134 that are each configured to engage complementary structures (not shown; see FIG. 2A) formed on one of the OSA connector blocks 200 or 250, as discussed in greater detail below in connection with FIGS. 2A-2D. The shell 106 further includes a shell cavity 138 which is sized and configured to receive the printed circuit board 126, as disclosed in greater detail below.

The optoelectronic module 100 can be configured for optical signal transmission and reception at a variety of per-second data rates including, but not limited to, 1 Gbit, 2 Gbit, 2.5 Gbit, 4 Gbit, 8 Gbit, 10 Gbit, 10.3 Gbit, 10.5 Gbit, or higher. Further, the optoelectronic module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Also, the optoelectronic module 100 can be configured to support various communication protocols including, but not limited to, Fast Ethernet, Gigabit Ethernet, 10 Gigabit Ethernet, and 1x, 2x, 4x, and 10x Fibre Channel. Further, the optoelectronic module 100 can be configured to operate at various temperature ranges including, but not limited to, 0° C. to 70° C. In addition, although one example of the optoelectronic module 100 is an optoelectronic transponder module configured to have a form factor that is substantially compliant with the X2 Multi-Source Agreement ("X2 MSA"), and is thus referred to as an X2 transponder module, the optoelectronic module 100 can alternatively be configured to have a variety of different form factors that are substantially compliant with other transceiver and/or transponder MSAs including, but not limited to, SFF, SFP, XFP, XPAK, or XENPAK.

2. Example OSA Connector Block and Example TOSA

Figure 2A:
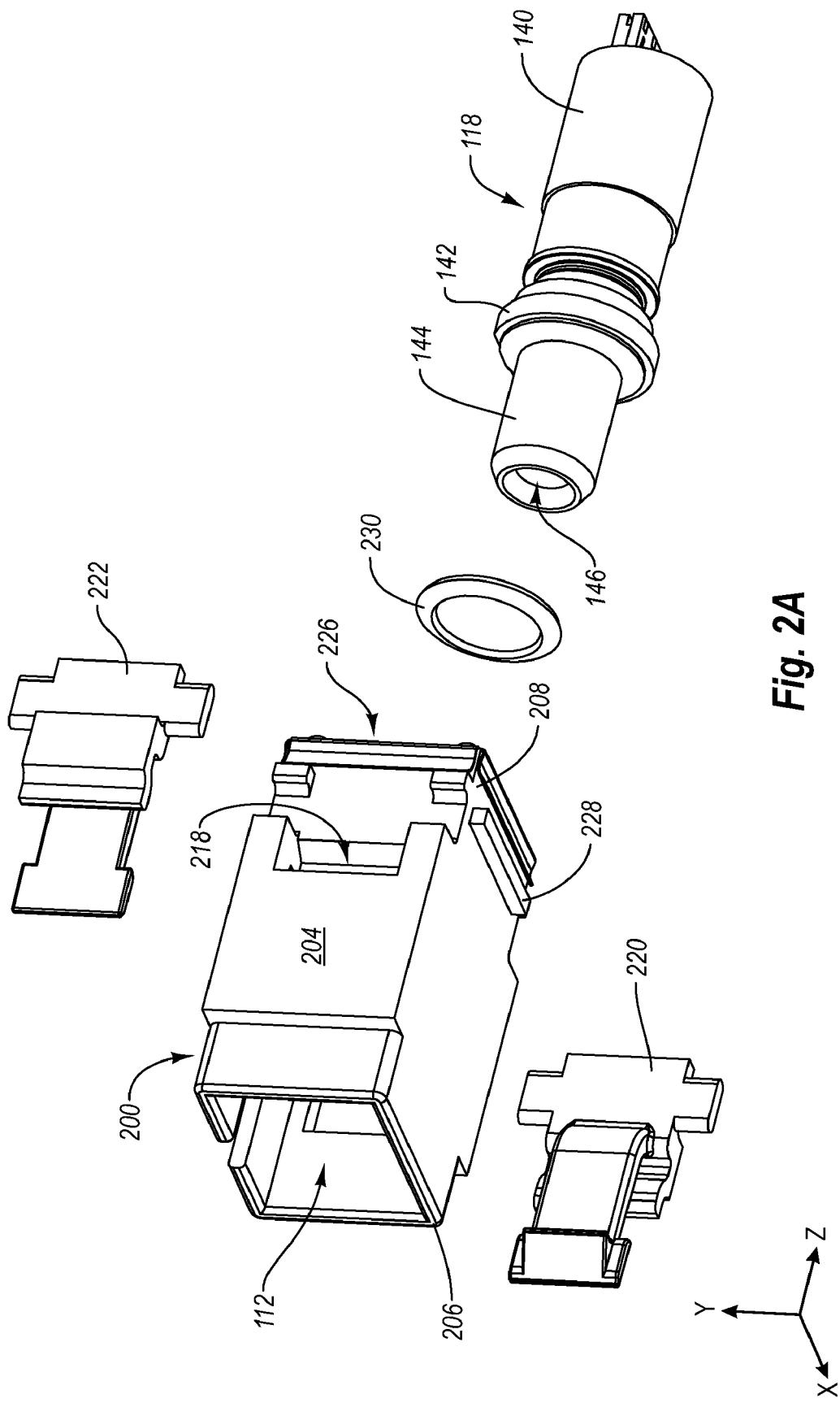
FIG. 2A is an exploded front perspective view of the OSA connector block and the TOSA of FIGS. 1B-1D.
Figure 2B:
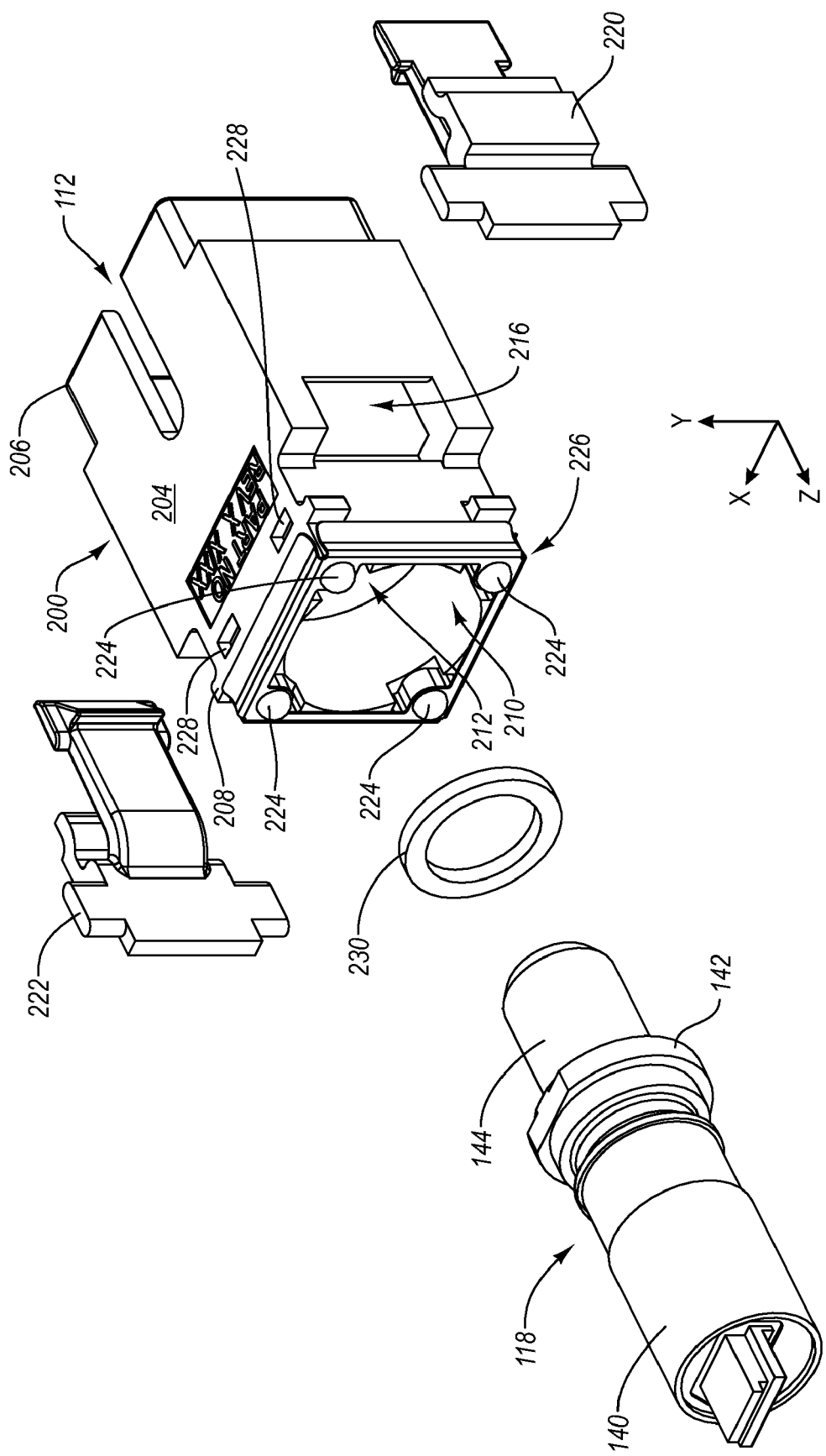
FIG. 2B is an exploded rear perspective view of the OSA connector block and the TOSA of FIG. 2A.

With continuing reference to FIGS. 1B and 1C, and with reference now to FIGS. 2A and 2B, aspects of the example OSA connector block 200 and the example TOSA 118 are disclosed. It is noted that, since the OSA connector blocks 200 and 250 are substantially identical in this example, only the OSA connector block 200 will be described in detail here. Nevertheless, the aspects disclosed herein can be generally applied to both of the OSA connector blocks 200 and 250.

As disclosed in FIG. 1C, the TOSA 118 and the ROSA 120, respectively received in the OSA connector blocks 200 and 250, have different form factors. However, the substantially identical OSA connector blocks 200 and 250 are specifically sized and configured to accommodate OSAs having various different form factors, such as the TOSA 118 and the ROSA 120. This accommodation of different OSAs having various different form factors is accomplished by connecting the different OSAs to the substantially identical OSA connector blocks using different sizes, shapes, and/or volumes of adhesive, as discussed in greater detail below.

With continued reference to FIGS. 1B, 1C, 2A, and 2B, the TOSA 118 includes a barrel 140 within which an optical transmitter, such as a laser, (not shown) is positioned. The optical transmitter is configured to convert electrical signals received through the PCB 126 from a host device (not shown) into corresponding optical signals. The TOSA 118 also includes a flange 142 and a nose piece 144. The nose piece 144 defines a port 146. The port 146 is configured to optically connect the optical transmitter positioned within the barrel 140 with the fiber-ferrule portion of an optical fiber connector (not shown) received within the transmit receptacle 112.

Similarly, the ROSA 120 of the optoelectronic module 100, as disclosed in FIG. 1C, includes a barrel, a flange, and a nose piece (not shown) similar to the barrel 140, flange 142 and nose piece 144 of the TOSA 118. The nose piece of the ROSA 120 defines a port (not shown) similar to the port 146. The port is configured to optically connect an optical receiver, such as a photodiode (not shown), positioned within the barrel to a fiber-ferrule portion of an optical fiber connector (not shown) received within the receive receptacle 114. The optical receiver is configured to convert optical signals received from the fiber-ferrule portion of the optical fiber connector into corresponding electrical signals for transmission to a host device (not shown) through the PCB 126.

It is noted that although the outside form factors of the respective barrels, flanges, and/or nose pieces of the TOSA 118 and the ROSA 120 may differ, the general interface between these OSA components and the OSA connector blocks 200 and 250 is similar, and only the interface between the TOSA 118 and the OSA connector block 200 will be described in detail here. Nevertheless, the aspects disclosed herein can be generally applied to the ROSA 120 and the OSA connector block 250.

With continued reference to FIGS. 2A, and 2B, the example OSA connector block 200 includes a body 204. In one example embodiment, the body 204 of the OSA connector block 200 can be a substantially monolithic component. For example, the body 204 of the OSA connector block 200 can be a monolithic die-cast component, although processes other than die-casting may be employed to produce a monolithic OSA connector block 200. The body 204 of the OSA connector block 200 may be formed from a metal, such as a zinc alloy or other suitable material.

Figure 4E:
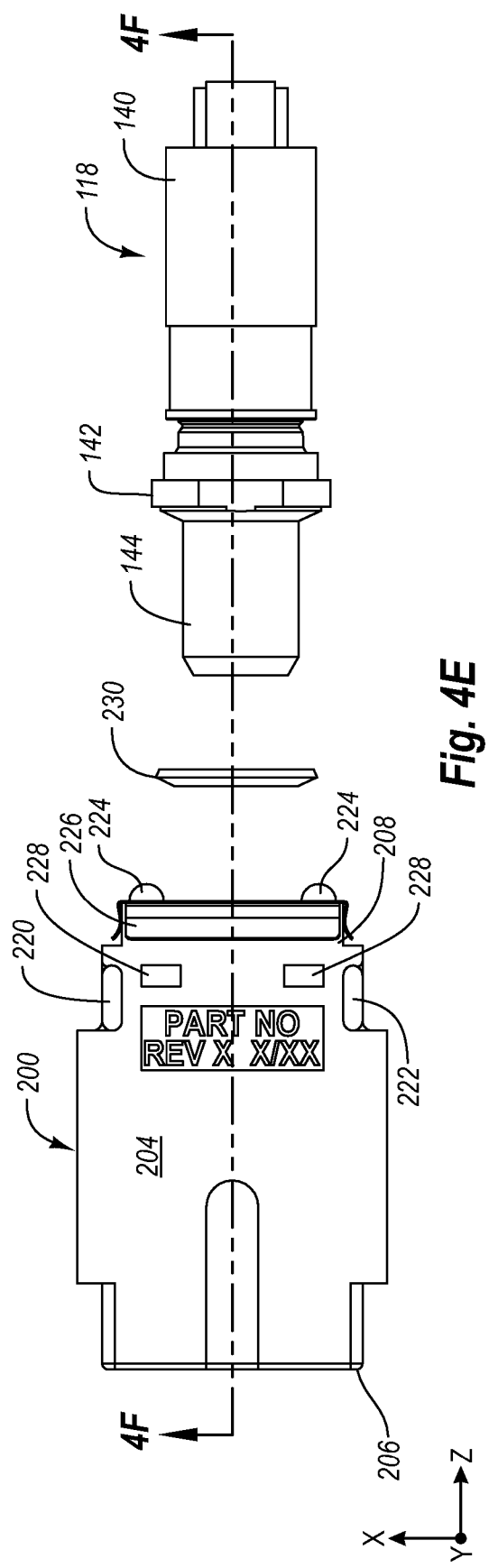
Figure 4F:
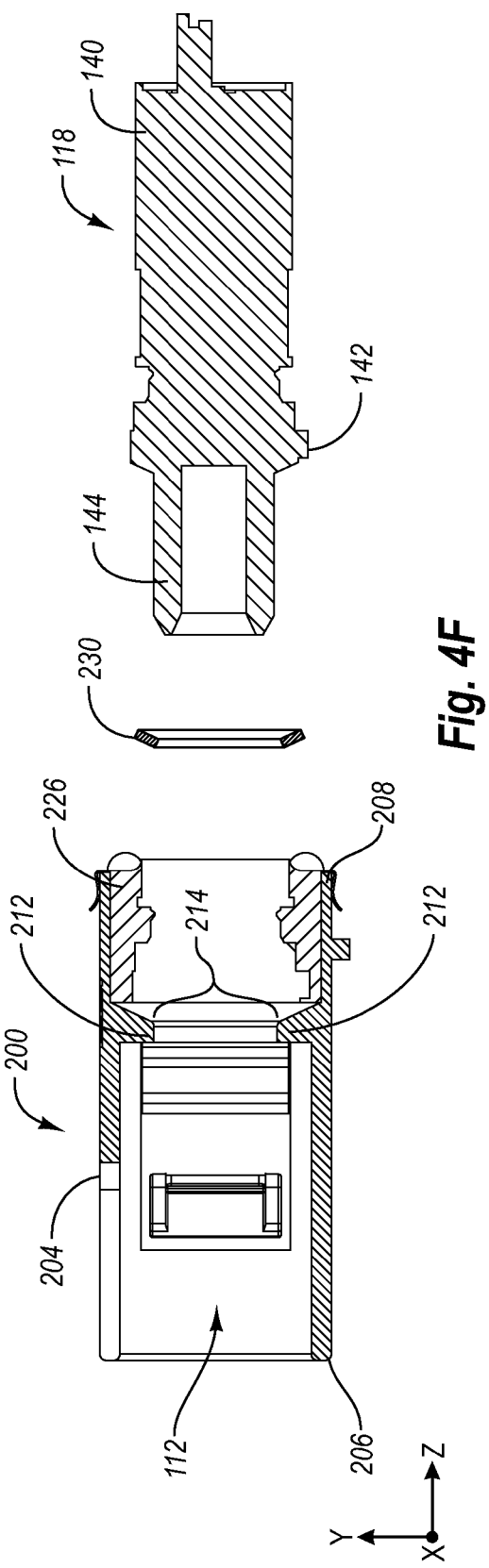

The body 204 of the OSA connector block 200 includes a first end 206 defining the transmit receptacle 112. The transmit receptacle 112 can be configured to releasably receive at least a portion of an optical fiber connector (not shown), such as an SC or an LC optical fiber connector. The body 204 of the OSA connector block 200 also includes a second end 208 defining a cavity 210. The cavity 210 can be configured to permanently receive at least a portion of an OSA, such as the TOSA 118. The body 204 of the OSA connector block 200 also includes a barrier 212 positioned between the transmit receptacle 112 and the cavity 210. In one example embodiment, the barrier 212 extends generally inward and defines an aperture 214 (not shown; see FIG. 4F) between the transmit receptacle 112 and the cavity 210. In particular, the barrier 212 is configured to receive the nose piece 144 of the TOSA 118 through the aperture 214 so that optical signals generated within the TOSA 118 can pass to an optical fiber connector (not shown) that is plugged into the transmit receptacle 112.

The body 204 of the OSA connector block 200 may further define a pair of openings 216 and 218. The opening 216 is configured to receive at least a portion of an optical connector latch arm 220 and the opening 218 is configured to receive at least a portion of an optical connector latch arm 222. After assembly, at least a portion of each of the optical connector latch arms 220 and 222 may extend into the transmit receptacle 112 of the body 204 so that the optical connector latch arms 220 and 222 are configured to releasably engage an optical fiber connector (not shown) that is plugged into the transmit receptacle 112. Additional details regarding the structure and function of example embodiments of the optical connector latch arms 220 and 222 can be found in co-pending U.S. patent application Ser. No. 11/693,861, titled "OPTICAL CONNECTOR LATCH ASSEMBLY FOR AN OPTOELECTRONIC MODULE," which is filed concurrently herewith and incorporated herein by reference in its entirety.

The body 204 of the OSA connector block 200 may also include a plurality of posts 224 extending from the body 204. Each of the posts 224 is configured to engage a corresponding mounting hole (not shown) of an EMI shield 226 in order to attach the EMI shield 226 to the body 204 of the OSA connector block 200. As disclosed in the Figures, each of the posts 224 may be swaged after the EMI shield 226 is attached to the body 204 of the OSA connector block 200. Swaging the posts 224 can permanently attach the EMI shield 226 to the body 204. Additional details regarding the structure and function of example embodiments of the EMI shield 226 can be found in co-pending U.S. patent application Ser. No. 11/693,679, titled "EMI SHIELD FOR AN OPTOELECTRONIC MODULE," which is filed concurrently herewith and incorporated herein by reference in its entirety.

As disclosed in FIGS. 1B, 1D, 2A, and 2B, the body 204 of the OSA connector block 200 may further include a first set of complementary structures 228 that corresponds to a second set of complementary structures 134 defined in the cover 104 and the shell 106 of the housing 102. More specifically, the first set of complementary structures 228 and the second set of complementary structures 134 are configured to engage each other during assembly of the optoelectronic module 100 in order to appropriately position the OSA connector block 200 with respect to the cover 104 and the shell 106 of the housing 102. It is noted that other complementary structures having different sizes, configurations, shapes, orientations, and positions could alternatively be employed, and the scope of the invention is not limited to the specific sizes, configurations, shapes, orientations, and positions disclosed in FIGS. 1B, 1D, 2A, and 2B.

3. Example OSA Connector Assembly

Figure 3A:
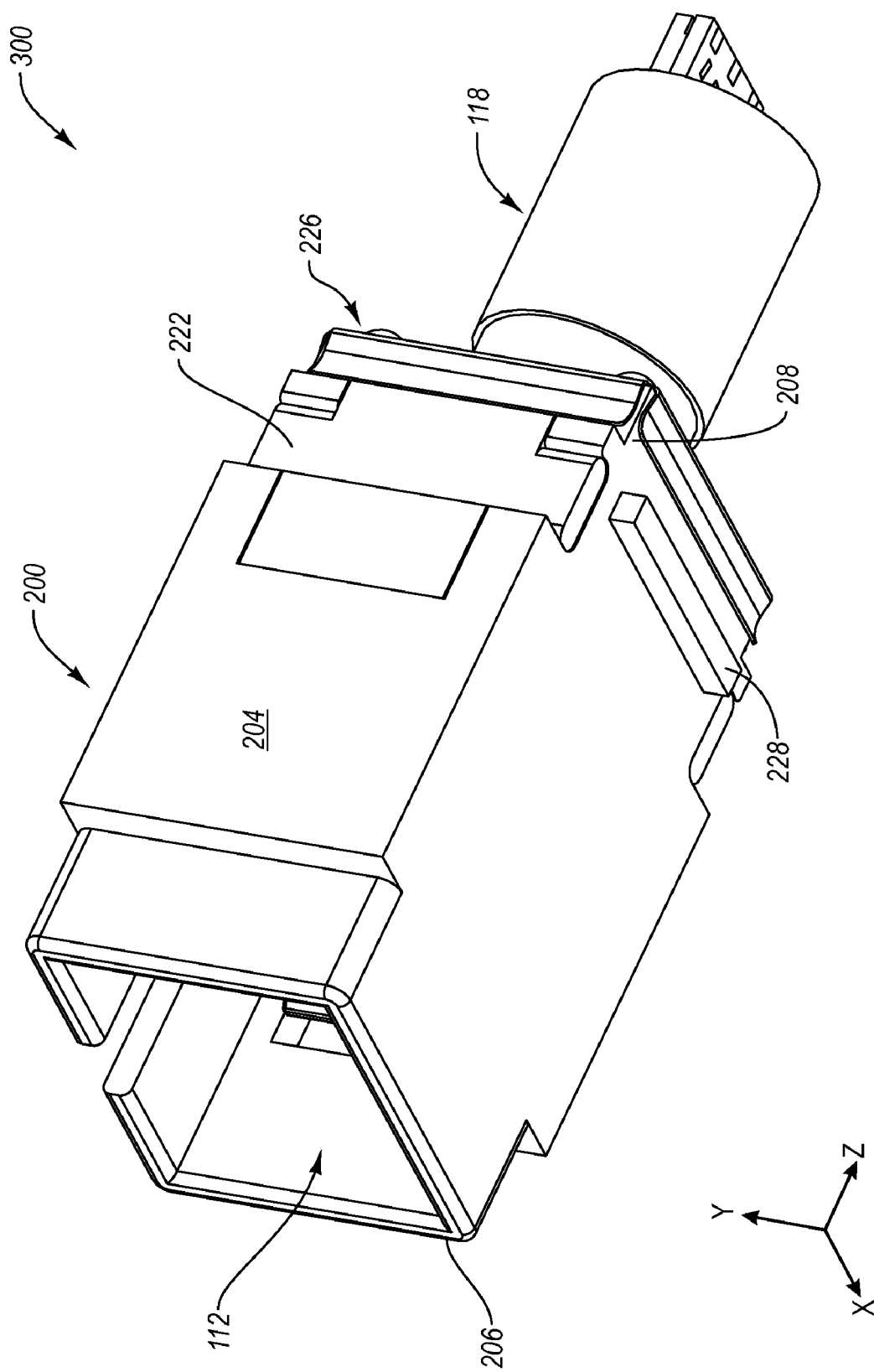
FIG. 3A is a front perspective view of the OSA connector block and the TOSA of FIGS. 2A and 2B assembled into an example OSA connector assembly.
Figure 3B:
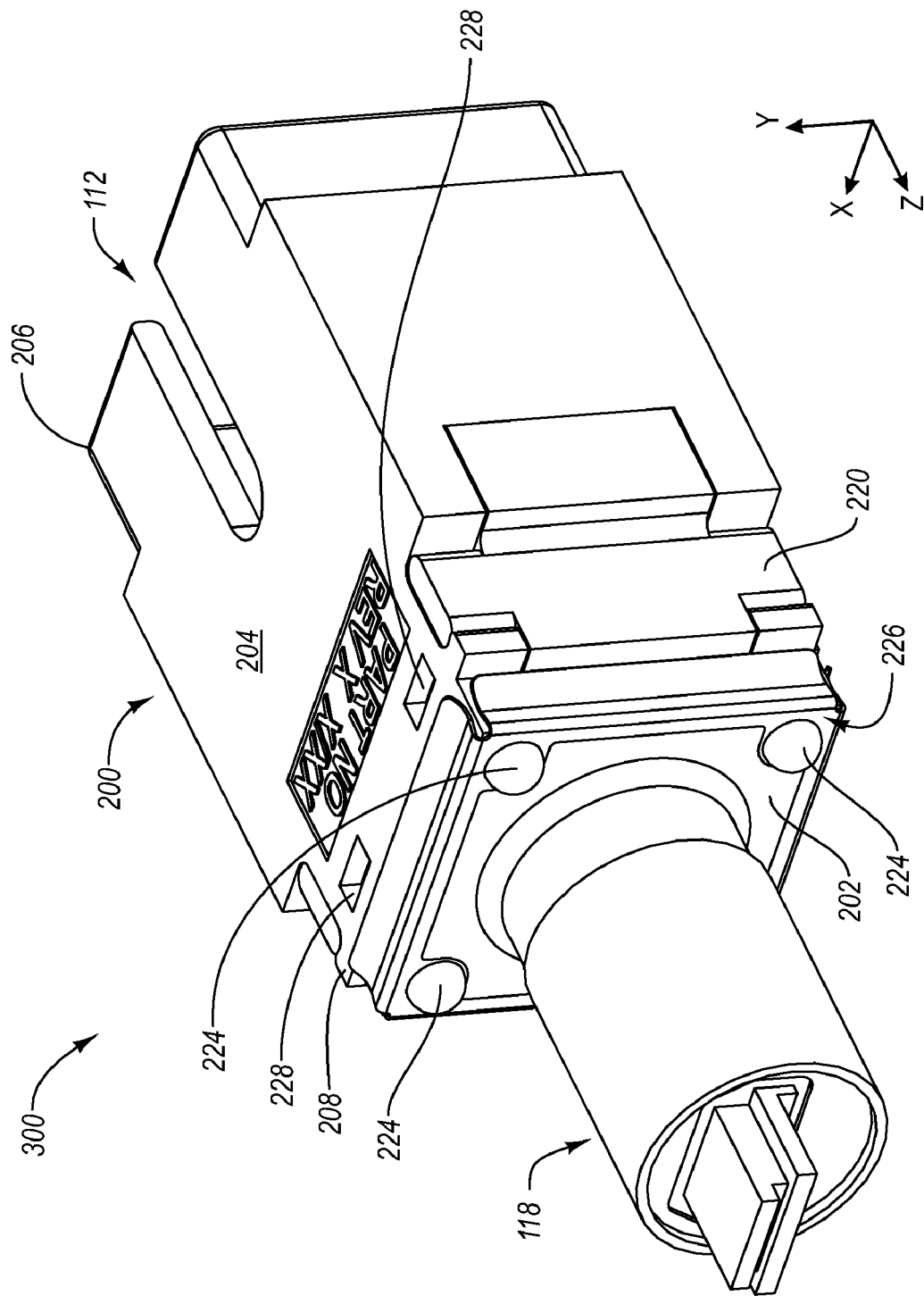
FIG. 3B is a rear perspective view of the example OSA connector assembly of FIG. 3A.

With reference now to FIGS. 3A and 3B, and also to FIGS. 4A-4F, further aspects of an example OSA connector assembly 300 are disclosed. As disclosed in FIGS. 3A and 3B, the OSA connector assembly 300 generally includes the TOSA 118 and the OSA connector block 200, connected together with an adhesive 202. The adhesive 202 can be, for example, an epoxy such as a heat cure epoxy, although other suitable adhesives can alternatively be employed. The adhesive 202 can also be employed to fill in any gaps between the OSA 118 and the OSA connector block 200. As such, the adhesive 202 can conform to the size, shape, and volume of any gaps between the OSA 118 and the interior of the OSA connector block 200.

A gasket 230, as also disclosed in FIGS. 2A and 2B, can also be employed to seal any gaps between the nose piece 144 of the TOSA 118 and the barrier 212 in the OSA connector block 200 in order to prevent the adhesive 202 from inadvertently leaking through the aperture 214 (not shown; see FIG. 4F) into the transmit receptacle 112. In one example embodiment disclosed in FIGS. 4A-4F, the gasket 230 can be compressed in the z direction between the TOSA 118 and the portion of the barrier 212 that faces the cavity 210 of the OSA connector block 200. In an alternative OSA connector assembly 300' disclosed in FIGS. 5A-5F, a gasket 230' can be compressed in the x-y direction between the TOSA 118 and the portion of a barrier 212' that defines an aperture 214' of the OSA connector block 200. Also, in either example embodiment, the gasket 230 or 230' can be formed from an electrically conductive material in order to substantially prevent EMI-causing signals that pass through the adhesive 202 from also passing through any gap that may exist between the nose piece 144 of the TOSA 118 and the barrier 212 or 212' in the OSA connector block 200.

4. Example Process for Assembling an Example OSA Connector Assembly

With reference now to FIGS. 1B, 1C, 2A, 2B, 4E and 4F, an example process for assembling the example OSA connector assembly 300 will be disclosed. First, the EMI shield 226 can be attached to the body 204 of the OSA connector block 200 using the posts 224. Next, the gasket 230 can be placed over the nose piece 144 of the TOSA 118. Then, the nose piece 144 of the TOSA 118 can be inserted into the cavity 210 and through the aperture 214 of the OSA connector block 200. Next, a fiber-ferrule portion of a jig (not shown) can be inserted into the receptacle 112 of the OSA connector block 200 and plugged into the port 146 of the TOSA 118. The gasket 230 can then brought into snug contact with the barrier 212 of the OSA connector block 200 via pressure applied by the jig such that any gaps between the nose piece 144 of the TOSA 118 and the barrier 212 are sealed by the gasket 230.

Continuing with the example process for assembling the OSA connector assembly 300, the jig can be configured to accurately align, in the x, y, and z directions, the nose piece 144 of the TOSA 118 with the transmit receptacle 112 of the OSA connector block 200. The TOSA 118 can then be permanently affixed to the OSA connector block 200, as disclosed in FIG. 2B, by injecting the adhesive 202 into the gap between the inside walls of the cavity 210 of the OSA connector block 200 and the TOSA 118 and curing the adhesive, or allowing the adhesive to cure on its own, such that the alignment of the nose piece 144 with the transmit receptacle 112 is made permanent. Next, the pair of optical connector latch arms 220 and 222 can be attached to the OSA connector block 200 through the openings 216 and 218, respectively, by, for example, snapping the optical connector latch arms 220 and 222 into place within the openings 216 and 218.

In one example embodiment, the OSA connector assembly 300 and a similarly assembled OSA connector assembly including the OSA connector block 250 and the ROSA 120 can be connected to the PCB 126 via the electrical interfaces 122 and 124 to form a combined assembly 148, as disclosed in FIG. 1B. This combined assembly 148 can then be inserted and affixed in place within the shell cavity 138 of the shell 106, as disclosed in FIGS. 1B and 1C. In this manner, the OSAs 118 and 120 can be accurately pre-aligned with the transmit and receive receptacles 112 and 114, respectively, and pre-connected to the PCB 126 prior to the positioning of the OSAs 118 and 120 in the shell 106 of the optoelectronic module 100.

The example OSA connector blocks 200 and 250 disclosed herein can help avoid problems associated with manufacturing tolerances and tolerance stacking between components of the optoelectronic module 100. For example, where the example OSA connector blocks 200 and 250 are substantially monolithic components, the inside dimensions of the receptacles 112 and 114 can be formed closer to the minimum allowable sizes for the corresponding connectors than would be possible where the receptacles 112 and 114, for example, are each formed from a combination of two or more assembled components, each having its own range of manufacturing tolerances. Forming the inside dimensions of the receptacles 112 and 114 closer to the minimum allowable sizes can help improve the wiggle performance of the receptacles 112 and 114.

While forming the inside dimensions of receptacles relatively closer to the minimum allowable sizes can cause hard-plug issues in typical optoelectronic modules, hard-plug issues can be avoided in the example optoelectronic module 100 by permanently affixing the OSAs 118 and 120 into the example OSA connector blocks 200 and 250, respectively, such that the nose pieces of the OSAs 118 and 120 are accurately aligned with the transmit and receive receptacles 112 and 114. The example OSA connector blocks 200 and 250 can therefore facilitate a relative improvement in wiggle performance while avoiding hard-plug issues.

In addition, the example OSA connector blocks 200 and 250 disclosed herein can also help extend the universality of the optoelectronic module 100 by helping to eliminate the impact of mechanical differences between different OSAs. For example, substantially identical OSA connector blocks 200 and 250 can be employed within the optoelectronic module 100 even where the form factors of the TOSA 118 and the ROSA 120 are not identical, as disclosed in FIG. 1C. The example OSA connector blocks 200 and 250 can thus be used to eliminate the interface between the OSAs 118 and 120 and other mechanical components of the optoelectronic module 100, such as the cover 104 and the shell 106 of the housing 102.

Further, alternative embodiments of the OSA connector blocks disclosed herein may have substantially similar external form factors, but dissimilar internal form factors. As such, these alternative OSA connector blocks can be seamlessly integrated into the optoelectronic module 100 without changing, for example, the configuration or form factor of the cover 104 and the shell 106 of the housing 102. Changing the internal form factor of an OSA connector block, or having multiple connector blocks with differing internal form factors, can thus allow the optoelectronic module 100 to accommodate OSAs having a variety of form factors without requiring a change in the configuration or form factor of any other components of the optoelectronic module 100. It is noted, therefore, that two OSA connector blocks having dissimilar internal form factors can thus be integrated into the example optoelectronic module 100. For example, the TOSA 118 can be affixed within a first OSA connector block, and the ROSA 120 can be affixed within a second OSA connector block, where the first and second OSA connector blocks have dissimilar internal form factors but substantially identical external form factors.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An OSA connector assembly comprising:
an OSA within which an optical transmitter or an optical receiver is positioned;
an OSA connector block comprising:
a monolithic body including:

a first end defining a receptacle, the receptacle being configured to receive at least a portion of an optical fiber connector;

a second end defining a cavity in which a portion of the OSA is situated; and a barrier positioned between the receptacle and the cavity, the barrier defining an aperture between the receptacle and the cavity; and an adhesive with which the OSA is attached to the OSA connector block, the adhesive occupying substantially all portions of the cavity not occupied by the OSA.

2. The OSA connector assembly as recited in claim 1, wherein each cavity is configured to alternatively receive a portion of each of two OSAs each having a different form factor.

3. The OSA connector assembly as recited in claim 1, wherein the receptacle is configured to releasably receive an SC optical fiber connector.

4. The OSA connector assembly as recited in claim 1, wherein the body further includes a pair of openings each configured to receive at least a portion of an optical connector latch arm.

5. The OSA connector assembly as recited in claim 4, further comprising a pair of optical connector latch arms, each optical connector latch arm at least partially situated within one of the pair of openings, at least a portion of each optical connector latch arm extending into the receptacle and configured to releasably engage an optical fiber connector.

6. The OSA connector assembly as recited in claim 1, wherein the body further includes a plurality of posts, each of which is configured to engage a corresponding mounting hole of an EMI shield.

7. The OSA connector assembly as recited in claim 1, further comprising a gasket positioned so as to seal any gaps between the OSA and the barrier.

8. An optoelectronic module comprising:

a transmitter OSA;

a receiver OSA;

a printed circuit board in electrical communication with the transmitter OSA and the receiver OSA;

a pair of OSA connector blocks each corresponding to one of the OSAs, each OSA connector block comprising:

a monolithic body including:

a first end defining a receptacle, the receptacle being configured to receive at least a portion of an optical fiber connector;

a second end defining a cavity in which at least a portion of the corresponding OSA is situated; and a barrier defining positioned between the receptacle and the cavity, and barrier defining an aperture between the receptacle and the cavity; and a housing within which the OSAs, the printed circuit board, and the OSA connector blocks are at least partially situated.

9. The optoelectronic module as recited in claim 8, wherein each cavity is configured to alternatively receive a portion of each of two OSAs each having a different form factor.

10. The optoelectronic module as recited in claim 8, wherein each receptacle is configured to receive an SC optical fiber connector.

11. The optoelectronic module as recited in claim 8, wherein each monolithic body further defines a pair of openings each configured to receive at least a portion of an optical connector latch arm.

12. The optoelectronic module as recited in claim 11, further comprising a pair of optical connector latch arms corresponding to each monolithic body, each optical connector latch arm at least partially situated within one of the pair of openings of the corresponding body, at least a portion of each optical connector latch arm extending into the receptacle of the corresponding body and configured to engage an optical fiber connector.

13. The optoelectronic module as recited in claim 8, wherein each monolithic body further defines a plurality of posts extending from the monolithic body, each post being configured to engage a corresponding mounting hole of an EMI shield.

14. The optoelectronic module as recited in claim 8, wherein each monolithic body further comprises a first structure and the housing further comprises a pair of second structures, wherein each first structure and each second structure are complementary structures configured to engage each other.

15. The optoelectronic module as recited in claim 8, wherein the optoelectronic module is an optoelectronic transponder module that substantially conforms to the X2 Multi-Source Agreement.

16. The optoelectronic module as recited in claim 8, further comprising a gasket positioned so as to seal any gaps between the OSA and the barrier.

17. An optoelectronic module comprising:

a first OSA;

a second OSA;

a printed circuit board in electrical communication with the first and second OSAs;

a first OSA connector block corresponding to the first OSA;

a second OSA connector block corresponding to the second OSA; and a housing within which the OSAs, the printed circuit board, and the first and second OSA connector blocks are at least partially situated, wherein each OSA connector block comprises:

a monolithic body including:

a first end defining a receptacle, the receptacle being configured to receive at least a portion of an optical fiber connector; and a second end defining a cavity in which at least a portion of the corresponding OSA is situated; and wherein the bodies of the first and second OSA connector blocks have substantially similar external form factors, but dissimilar internal form factors.

18. The optoelectronic module as recited in claim 17, wherein the internal dimensions and/or form factor of the body of the first OSA connector block are incompatible with the external dimensions and/or form factor of the second OSA.

19. The optoelectronic module as recited in claim 17, wherein the internal dimensions and/or form factor of the body of the second OSA connector block are incompatible with the external dimensions and/or form factor of the first OSA.

\* \* \* \* \*